(12) United States Patent
Lo et al.

(10) Patent No.: US 12,174,596 B2
(45) Date of Patent: Dec. 24, 2024

(54) GRINDING AND POLISHING SIMULATION METHOD AND SYSTEM AND GRINDING AND POLISHING PROCESS TRANSFERRING METHOD

(71) Applicant: INDUSTRIAL TECHNOLOGY RESEARCH INSTITUTE, Hsinchu (TW)

(72) Inventors: Yuan-Chieh Lo, Taichung (TW); Yu-Hsun Wang, Taichung (TW); Pei-Chun Lin, Taipei (TW); Chih-Hsuan Shih, Xihu Township (TW); Shu Huang, Zhudong Township (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 389 days.

(21) Appl. No.: 17/135,729

(22) Filed: Dec. 28, 2020

(65) Prior Publication Data

US 2021/0331287 A1 Oct. 28, 2021

Related U.S. Application Data

(60) Provisional application No. 63/013,602, filed on Apr. 22, 2020.

(30) Foreign Application Priority Data

Nov. 6, 2020 (TW) .................................. 109138813

(51) Int. Cl.
*G05B 13/04* (2006.01)
*B24B 51/00* (2006.01)
*G05B 17/00* (2006.01)

(52) U.S. Cl.
CPC .............. *G05B 13/04* (2013.01); *B24B 51/00* (2013.01); *G05B 17/00* (2013.01)

(58) Field of Classification Search
CPC ...... G05B 13/04; G05B 13/045; G05B 17/00; B24B 1/00; B24B 37/005; B24B 51/00; G06F 30/20
See application file for complete search history.

(56) References Cited

U.S. PATENT DOCUMENTS 6,492,273 B1 12/2002 Hofmann et al.
7,246,023 B2 * 7/2007 Bhateja .................. B24B 51/00
702/179

(Continued)

FOREIGN PATENT DOCUMENTS

CN 101088705 A 12/2007
CN 101738981 A 6/2010

(Continued)

OTHER PUBLICATIONS

US 10,358,870 B2, 07/2019, Dann et al. (withdrawn)

(Continued)

*Primary Examiner* — Jay Hann
(74) *Attorney, Agent, or Firm* — Birch, Stewart, Kolasch & Birch, LLP

(57) ABSTRACT

A grinding and polishing simulation method, a grinding and polishing simulation system and a grinding and polishing process transferring method. The grinding and polishing simulation method includes the following steps. A sensing information of a grinding and polishing apparatus when grinding or polishing a workpiece is obtained. A plurality of model parameters is identified according to the sensing information. At least one quality parameter is calculated according to a machining path, a plurality of process parameters and the plurality of model parameters.

15 Claims, 9 Drawing Sheets

(56) References Cited

U.S. PATENT DOCUMENTS

| | | | | |
|---|---|---|---|---|
| 8,051,863 | B2* | 11/2011 | Peng | H01L 21/67051 |
| | | | | 134/113 |
| 11,103,909 | B2* | 8/2021 | Olsson | G05B 19/40938 |
| 2008/0166948 | A1 | 7/2008 | Bhagavat et al. | |
| 2011/0190916 | A1* | 8/2011 | Patel | G06F 30/00 |
| | | | | 700/103 |
| 2011/0192825 | A1 | 8/2011 | Calefati | |
| 2013/0035781 | A1* | 2/2013 | Cameron | G05B 19/41815 |
| | | | | 700/186 |
| 2018/0326591 | A1 | 11/2018 | Hausler | |
| 2020/0356711 | A1* | 11/2020 | Egan | G06F 30/398 |
| 2022/0003679 | A1* | 1/2022 | Brullot | G16C 60/00 |

FOREIGN PATENT DOCUMENTS

| | | | |
|---|---|---|---|
| CN | 102479266 | B | 10/2014 |
| CN | 104889864 | A | 9/2015 |
| CN | 106334993 | A | 1/2017 |
| CN | 104021247 | B | 3/2017 |
| CN | 104972362 | B | 10/2017 |
| CN | 108398922 | A | 8/2018 |
| CN | 108655898 | A | 10/2018 |
| CN | 109202688 | A | 1/2019 |
| CN | 109664296 | A | 4/2019 |
| CN | 109686410 | A | 4/2019 |
| CN | 110118543 | A | 8/2019 |
| CN | 110780639 | A | 2/2020 |
| CN | 110900379 | A | 3/2020 |
| CN | 110990964 | A | 4/2020 |
| JP | 2004-50300 | A | 2/2004 |
| JP | 2005-88106 | A | 4/2005 |
| JP | 2005-342851 | A | 12/2005 |
| JP | 2013-94902 | A | 5/2013 |
| TW | 201918328 | A | 5/2019 |
| TW | I681845 | B | 1/2020 |

OTHER PUBLICATIONS

Lv, H., et al. "Parameter Optimization Using PSO for ESN-based Robotic Belt Grinding Modeling" IEEE 3rd Int'l Workshop on Intelligent Sys. & Applications (2011) available from <https://ieeexplore.ieee.org/abstract/document/5873383> (Year: 2011).*

Zhang, G., et al. "Multi-objective optimization for surface grinding process using a hybrid particle swarm optimization algorithm" Int'l J. Manufacturing Technology, vol. 71, pp. 1861-1872 (2014) (Year: 2014).*

Silva, M. "Off-line Programming of Grinding Robots at Grohe Portugal" IEEE Int'l Conf. on Autonomous Robot Systems & Competitions, pp. 294-299 (2016) (Year: 2016).*

Xie, X., & Sun, L. "Force Control Based Robotic Grinding System and Application" IEEE 12th World Congress on Intelligent Control & Automation, pp. 2552-2555 (2016) (Year: 2016).*

Pandiyan, V., et al. "Predictive Modelling and Analysis of Process Parameters on Material Removal Characteristics in Abrasive Belt Grinding Process" Applied Sciences, vol. 7, issue 4 (2017) available from <https://www.mdpi.com/2076-3417/7/4/363> (Year: 2017).*

Guo, J., et al. "Optimal Parameter Selection in Robotic Belt Polishing for Aeroengine Blade Based on GRA-RSM Method" Symmetry, vol. 11, pp. 1526-1537 (2019) (Year: 2019).*

Hailong et al., "Design and implementation of haptics-based virtual teaching system for belt grinding", (Modern Manufacturing Engineering), Dec. 2018, pp. 151-156.

Kuhlenkoetter et al., "A Robot System for High Quality Belt Grinding and Polishing Processes", Source: Cutting Edge Robotics, ISBN 3-86611-038-3, pp. 784, ARS/pIV, Germany, Jul. 2005, pp. 755-770.

Ren et al., "A local process model for simulation of robotic belt grinding", ScienceDirect, International Journal of Machine Tools & Manufacture, 47, (2007), pp. 962-970.

Zhang et al., "An efficient method for solving the Signorini problem in the simulation of free-form surfaces produced by belt grinding", ScienceDirect, International Journal of Machine Tools & Manufacture, 45, (2005), pp. 641-648.

Zhang et al., "Real-Time Simulation of Robot Controlled Belt Grinding Processes of Sculptured Surfaces", International Journal of Advanced Robotic Systems, vol. 1, No. 2, (2004), ISSN 1729-8806, pp. 109-114.

"Introduction of Robot Intelligent Manufacturing Cell and Application of Grinding and Polishing," July 1. 2017, pp. 28-43 (16 pages total), with English abstract.

Taiwanese Office Action and Search Report for Taiwan Application No. 109138813, dated Jan. 6, 2022.

Chinese Office Action and Search Report for corresponding Chinese Application No. 202110005115.X, dated Mar. 11, 2023.

Malkin et al., "Stimulation, Optimization, and Control of Cylindrical Grinding Processes," Diamond & Abrasives Engineering, No. 5, 2001, pp. 11-16 (8 pages total), with English Abstract.

* cited by examiner

GRINDING AND POLISHING SIMULATION METHOD AND SYSTEM AND GRINDING AND POLISHING PROCESS TRANSFERRING METHOD

This application claims the benefits of U.S. provisional application Ser. No. 63/013,602, filed Apr. 22, 2020 and Taiwan application Serial No. 109138813, filed Nov. 6, 2020, the disclosures of which are incorporated by reference herein in its entirety.

TECHNICAL FIELD

The disclosure relates in general to a simulation method, a simulation method system and a process transfer method, and more particularly to a grinding and polishing simulation method, a grinding and polishing simulation system and a grinding and polishing process transferring method.

BACKGROUND

Along with the industrial development, many processing processes are already automatized, particularly a large amount of labor in the grinding and polishing process has now been replaced with robotic arms or robots. Although the grinding and polishing process has gradually become automatized, tedious labor is still required to adjust various device parameters to meet the processing requirements and the device configurations of different products, such that the processing quality can be assured. On the other hand, existing technology is still unable to transfer the grinding and polishing process between the production lines.

Therefore, it has become a prominent task for the industry to provide a simulation system and method, which, through the simulation of the grinding and polishing process, resolves the problem that the adjustment of device parameters takes a large amount of labor and time, and to provide a process transfer method to resolve the problem that the grinding and polishing process cannot be transferred between the production lines.

SUMMARY

The disclosure is directed to a grinding and polishing simulation method, a grinding and polishing simulation system and a grinding and polishing process transferring method.

According to one embodiment, a grinding and polishing simulation method is provided. A sensing information of a grinding and polishing apparatus when grinding or polishing a workpiece is obtained. A plurality of model parameters is identified according to the sensing information. At least one quality parameter is calculated according to a machining path, a plurality of process parameters and the model parameters.

According to another embodiment, a grinding and polishing simulation system is provided. The grinding and polishing simulation system includes a sensing unit, an identification unit and a simulation unit. The sensing unit is configured to obtain a sensing information of a grinding and polishing apparatus when grinding or polishing a workpiece. The identification unit is configured to identify a plurality of model parameters according to the sensing information. The simulation unit is configured to calculate at least one quality parameter according to a machining path, a plurality of process parameters and the model parameters.

According to an alternative embodiment, a grinding and polishing process transferring method is provided. A first simulated environment corresponding to a first real environment is created, wherein the first real environment includes a first grinding and polishing apparatus and a first robot, and the first simulated environment includes a first grinding and polishing apparatus physical model and a first workpiece physical model. A first sensing information of the first grinding and polishing apparatus and the first robot when grinding or polishing a first workpiece is obtained. A plurality of first model parameters is identified according to the first sensing information. A first machining path, a plurality of first process parameters and the first model parameters are inputted to the first grinding and polishing apparatus physical model and the first workpiece physical model to calculate at least one first quality parameter. A second simulated environment corresponding to a second real environment is created, wherein the second real environment includes a second grinding and polishing apparatus and a second robot, and the second simulated environment includes a second grinding and polishing apparatus physical model and a second workpiece physical model. A first calibration information associated with the first grinding and polishing apparatus and the first robot is obtained, a second calibration information associated with the second grinding and polishing apparatus and the second robot is obtained, and the first simulated environment and the second simulated environment are calibrated according to the first calibration information and the second calibration information respectively. The first simulated environment and the second simulated environment are analyzed to obtain a difference information. At least one part of the first machining path, the first process parameters and the first model parameters are inputted to the second grinding and polishing apparatus physical model and the second workpiece physical model according to the difference information to simulate the operation of grinding or polishing a second workpiece by the second grinding and polishing apparatus and the second robot and to calculate at least one second quality parameter.

The above and other aspects of the disclosure will become understood with regard to the following detailed description of the preferred but non-limiting embodiment(s). The following description is made with reference to the accompanying drawings.

Figure 1:
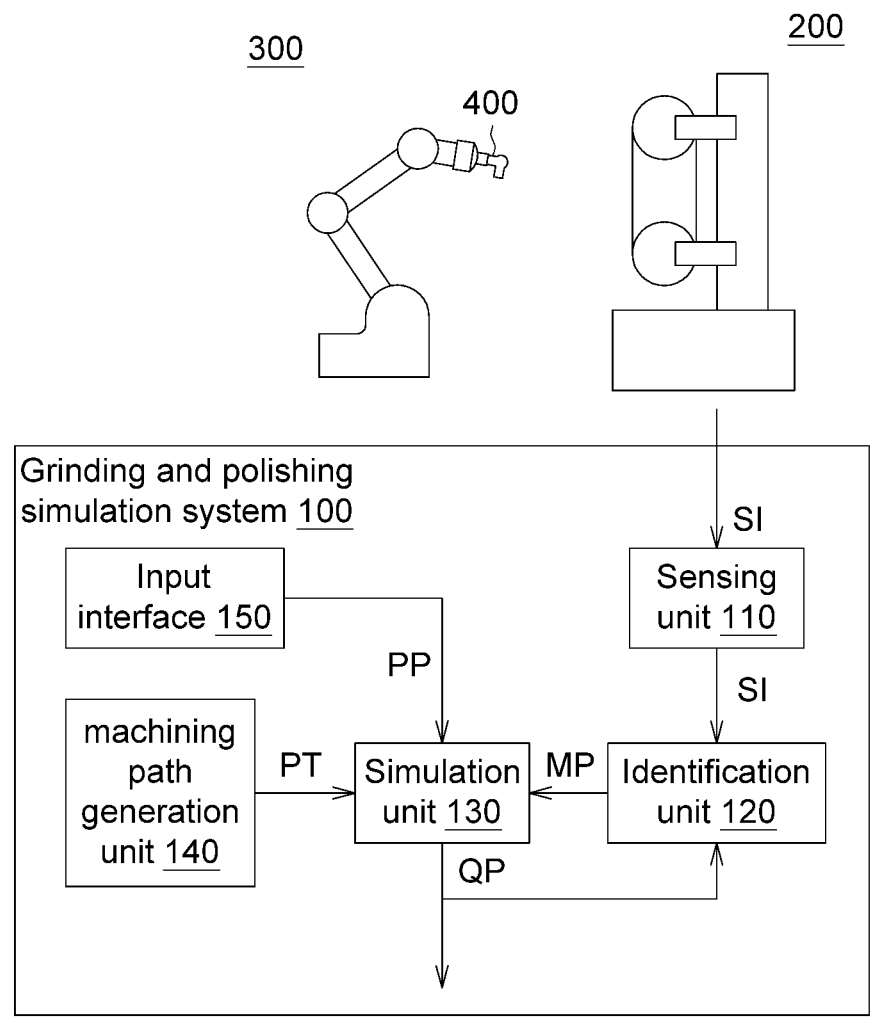
FIG. 1 is a schematic diagram of a grinding and polishing simulation system, a grinding and polishing apparatus, a robot, and a workpiece.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Referring to FIG. 1, a schematic diagram of a grinding and polishing simulation system 100, a grinding and polishing apparatus 200, a robot 300, and a workpiece 400 is shown. The grinding and polishing simulation system 100 includes a sensing unit 110, an identification unit 120, a simulation unit 130, a machining path generation unit 140 and an input interface 150. The sensing unit 110, which can be a force sensor, a displacement sensor, a surface roughness meter or a vision sensor, is configured to sense various sensing information SI of a grinding and polishing apparatus 200 and a robot 300 when grinding or polishing the workpiece 400. The identification unit 120, the simulation unit 130 and the machining path generation unit 140 can be realized by a circuit, a chip, or a circuit board. The input interface 150 can be realized by a touch screen, or a keyboard.

Figure 2:
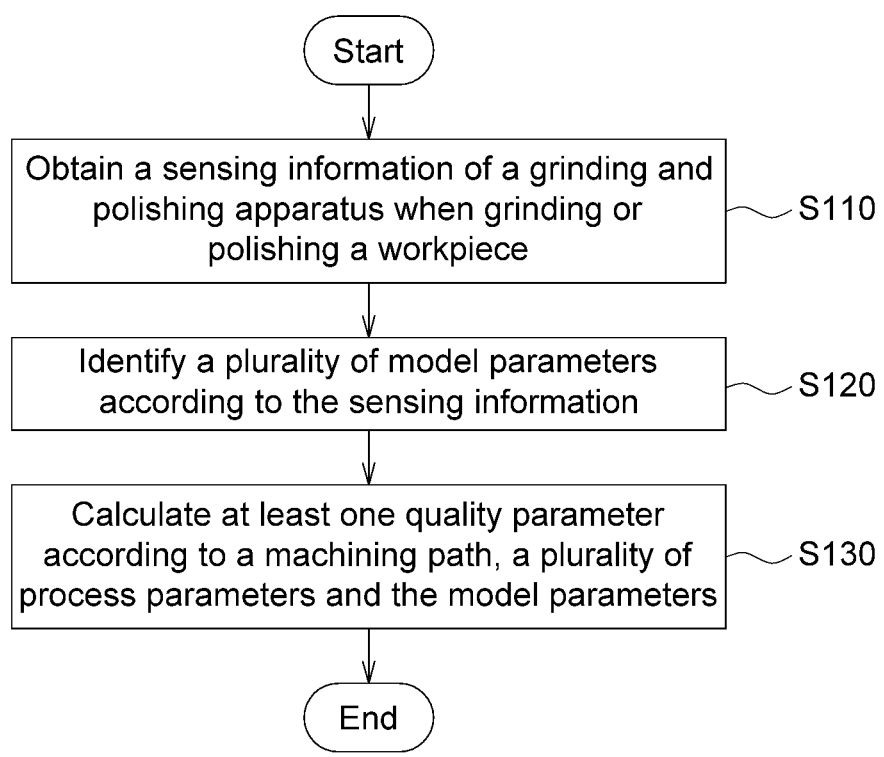
FIG. 2 is a flowchart of a grinding and polishing simulation method according to an embodiment of the present disclosure.

Refer to FIGS. 1 and 2. FIG. 2 is a flowchart of a grinding and polishing simulation method according to an embodiment of the present disclosure. In step S110, a sensing information SI of the grinding and polishing apparatus 200 when grinding or polishing the workpiece 400 is obtained by the sensing unit 110. In FIG. 1, the robot 300 grasps the workpiece 400 to touch the grinding and polishing apparatus 200 to perform a grinding and polishing operation. In an embodiment, the robot 300 can also grasp the grinding and polishing apparatus 200 to touch the workpiece 400 to perform a grinding and polishing operation (not illustrated). The method of the present disclosure can be used in the two arrangements disclosed above but is not limited thereto. In the present step, the sensing unit 110 only needs to obtain the sensing information SI of the grinding and polishing apparatus 200 and the workpiece 400 and does not need to obtain the sensing information of the robot 300. Examples of the sensing information SI include six-axis force information, geometric variation, surface roughness, or surface state of the workpiece.

Figure 3:
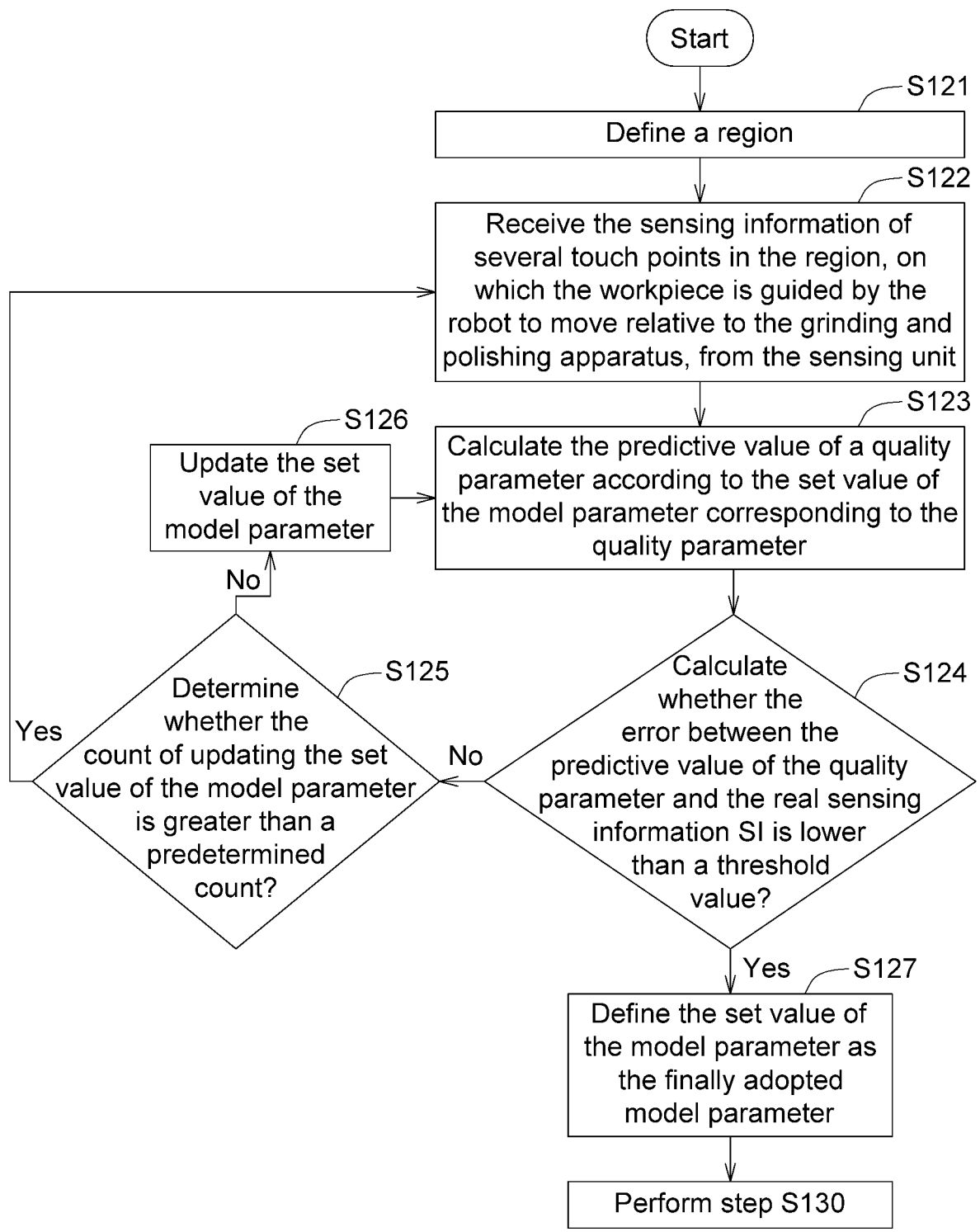
FIG. 3 is a flowchart of sub-steps of step S110 and S120 according to an embodiment of the present disclosure.

In step S120, a plurality of model parameters MP is identified by the identification unit 120 according to the sensing information SI. Referring to FIG. 3, a flowchart of sub-steps of step S110 and S120 according to an embodiment of the present disclosure is shown. Steps S110 and S120 include steps S121 to S127.

Figure 4:
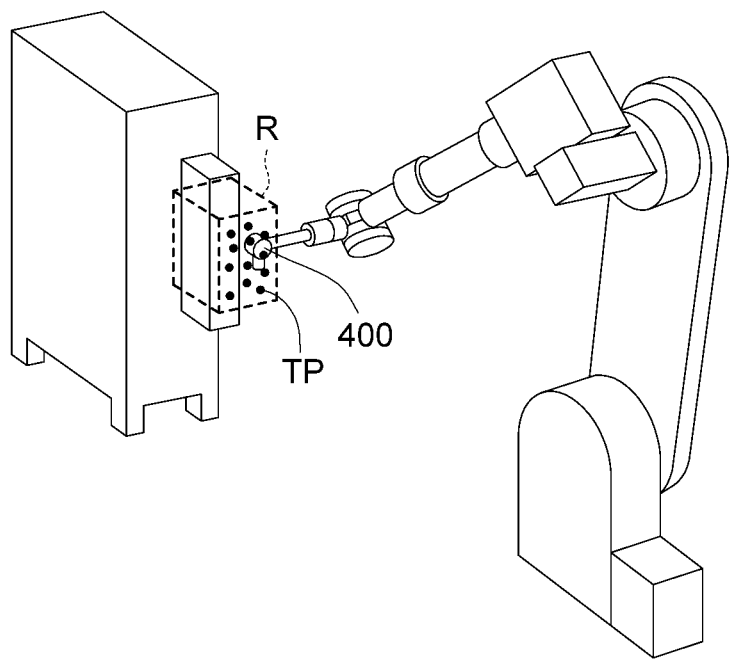
FIG. 4 is a schematic diagram of a region defined by an identification unit according to an embodiment of the present disclosure.

In step S121, a region R is defined by the identification unit 120. Referring to FIG. 4, a schematic diagram of a region R defined by an identification unit 120 according to an embodiment of the present disclosure is shown. Furthermore, the identification unit 120, based on the touch position between the workpiece 400 and the grinding and polishing apparatus 200, sets the region R including the said touch position and the vicinity thereof. The region R can be a cube, a sphere or other shapes. After the region R is defined by the identification unit 120, the workpiece 400 is guided by the robot 300 to move on a plurality of touch points TP in the region R relative to the grinding and polishing apparatus 200. It should be noted that there are two scenarios when the robot 300 guides the workpiece 400 to move relative to the grinding and polishing apparatus 200. That is, the robot 300 grasps the workpiece 400 to move on the grinding and polishing apparatus 200 (in other words, part in hand) or the robot 300 grasps the grinding and polishing apparatus 200 to move on the workpiece 400 (in other words, tool in hand).

In step S122, the sensing information SI of a plurality of touch points TP in the region R, on which the workpiece 400 is guided by the robot 300 to move relative to the grinding and polishing apparatus 200, is received from the sensing unit 110 by the identification unit 120. Furthermore, the sensing unit 110 obtains the sensing information SI of each of the touch points TP, and the identification unit 120 receives the sensing information SI.

In step S123, the predictive value of a quality parameter is calculated by the identification unit 120 according to the set value of the model parameter corresponding to the quality parameter. The identification unit 120 needs to calculate the predictive value of the quality parameter according to a pre-arbitrarily set value of a model parameter. The set value of the model parameter is such as the set value of the geometric parameter, the set value of the sand belt tension, the set value of the deformation correction parameter, or the set value of the wear correction parameter of the grinding and polishing apparatus 200 and the workpiece 400. The predictive value of the quality parameter is such as the predictive value of the normal/tangential force distribution, the predictive value of the material removal rate, the predictive value of the surface roughness, or the predictive value of the coverage. Since the predictive value of the quality parameter and the set value of the model parameter are associated with each other, the predictive value of a quality parameter can be calculated according to the set value of the model parameter corresponding to the quality parameter.

In step S124, whether the error between the predictive value of the quality parameter and the real sensing information SI is lower than a threshold value is calculated by the identification unit 120. If yes, the method proceeds to step S127; otherwise, the method proceeds to step S125. Firstly, the identification unit 120 analyzes the quality parameter corresponding to the real sensing information SI. For example, the identification unit 120 analyzes the normal/tangential force distribution corresponding to the six-axis force information, analyzes the material removal rate corresponding to the workpiece geometric variation, and analyzes the coverage corresponding to the surface state of the workpiece. Then, the identification unit 120 calculates whether the error between the predictive value of the quality parameter and the quality parameter corresponding to the real sensing information SI is lower than a threshold value, For example, the identification unit 120 calculates whether the root mean square error (RMSE), the mean square error (MSE), the mean absolute error (MAE), the mean absolute percentage error (MAPE) or the symmetric mean absolute percentage error (SMAPE) between the predictive value of the quality parameter and the real sensing information SI of the quality parameter is lower than a threshold value, wherein the setting of the threshold value depends on the situations.

If the error between the predictive value of the quality parameter and the real sensing information SI is lower than the threshold value, this implies that the set value of the model parameter of step S123 is suitable. Then, the method proceeds to step S127, the set value of the model parameter is defined as the model parameter MP finally adopted by the identification unit 120, and the method proceeds to step S130.

If the error between the predictive value of the quality parameter and the real sensing information SI is not lower than the threshold value, this implies that the set value of the model parameter of step S123 is not suitable, and the method proceeds to step S125.

In step S125, whether the count of updating the set value of the model parameter is greater than a predetermined count is determined by the identification unit 120, wherein the setting of the predetermined count depends on the situations. If yes, this implies that the error between the predictive value of the quality parameter and the real sensing information SI is not lower than the threshold value within the predetermined count, and the method returns to step S122 to obtain another sensing information SI and perform subsequent steps; otherwise, this implies that the count of updating the set value of the model parameter is still within the predetermined count, and the method proceeds to step S126.

In step S126, the set value of the model parameter is updated by the identification unit 120. For example, the identification unit 120 updates the set value of the geometric parameter, the set value of the sand belt tension, the set value of the deformation correction parameter, or the set value of the wear correction parameter of the grinding and polishing apparatus 200 and the workpiece 400. Then, the method returns to step S123, the updated predictive value of the quality parameter is calculated by the identification unit 120 according to the updated set value of the model parameter corresponding to the quality parameter. Then, the method proceeds to step S124, whether the error between the updated predictive value of the quality parameter and the real sensing information SI is lower than a threshold value is calculated by the identification unit 120. That is, steps S123 to S126 form a recursive process which will be repeated until the error between the predictive value of the quality parameter and the real sensing information SI calculated according to the set value of the model parameter is lower than the threshold value (step S124), or until the count of updating the set value of the model parameter is greater than the predetermined count (step S125).

In step S125, when the identification unit 120 determines that the count of updating the set value of the model parameter is greater than the predetermined count, this implies that the initial set value of the model parameter is not selected properly, therefore the set value of the model parameter will not converge regardless how many times the set value of the model parameter has been updated (that is, despite that the count of repeating steps S123 to S126 is over the predetermined count, the error is still not lower than the threshold value). Under such circumstance, the method needs to return to step S122 of obtaining the sensing information SI to select an initial set value and start the next recursive process of error comparison.

Refer to FIGS. 1 and 2 again. In step S130, at least one quality parameter QP is calculated by the simulation unit 130 according to the machining path PT, the process parameters PP and the model parameters MP. In the present embodiment, the machining path PT is generated by the machining path generation unit 140 according to the workpiece 400, wherein the machining path PT is generated by an off-line programming code. The process parameters PP are inputted by an on-site person through the input interface 150. In another embodiment, the machining path PT can also be inputted by an on-site person through the input interface 150. The process parameters PP are such as grinding and polishing touch points, sand belt number, workpiece speed, sand belt/polisher speed, feed depth, workpiece material, or original surface quality of the workpiece. The model parameters MP are such as geometric parameter, sand belt tension, deformation correction parameter, or wear correction parameter of the grinding and polishing apparatus 200 and the workpiece 400. The at least one quality parameter QP is such as normal/tangential force distribution, material removal rate, surface roughness, or coverage. In another embodiment, the grinding and polishing simulation system 100 further includes an external sensing unit (not illustrated), through which the grinding and polishing simulation system 100 can directly obtain the model parameters MP from the grinding and polishing apparatus 200 and the workpiece 400. Then, as indicated in FIG. 1, the simulation unit 130 calculates at least one quality parameter QP according to the machining path PT, the process parameters PP and the model parameters MP.

Figure 5:
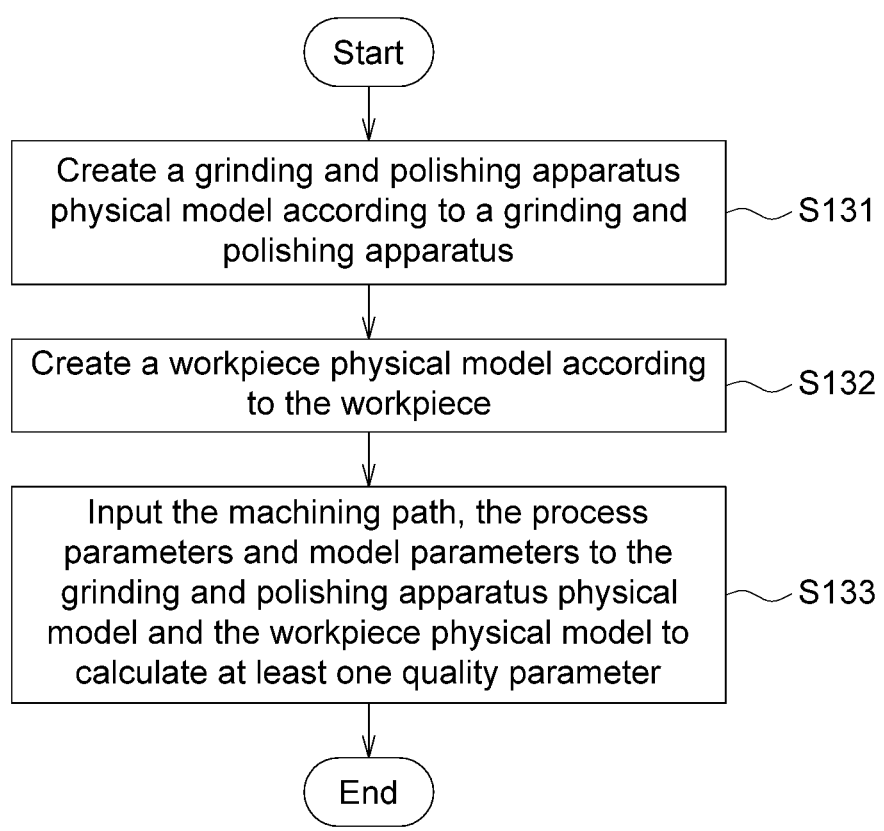
FIG. 5 is a flowchart of sub-steps of step S130 according to an embodiment of the present disclosure.

Referring to FIG. 5, a flowchart of sub-steps of step S130 according to an embodiment of the present disclosure is shown. Step S130 includes steps S131 to S133.

Figure 6:
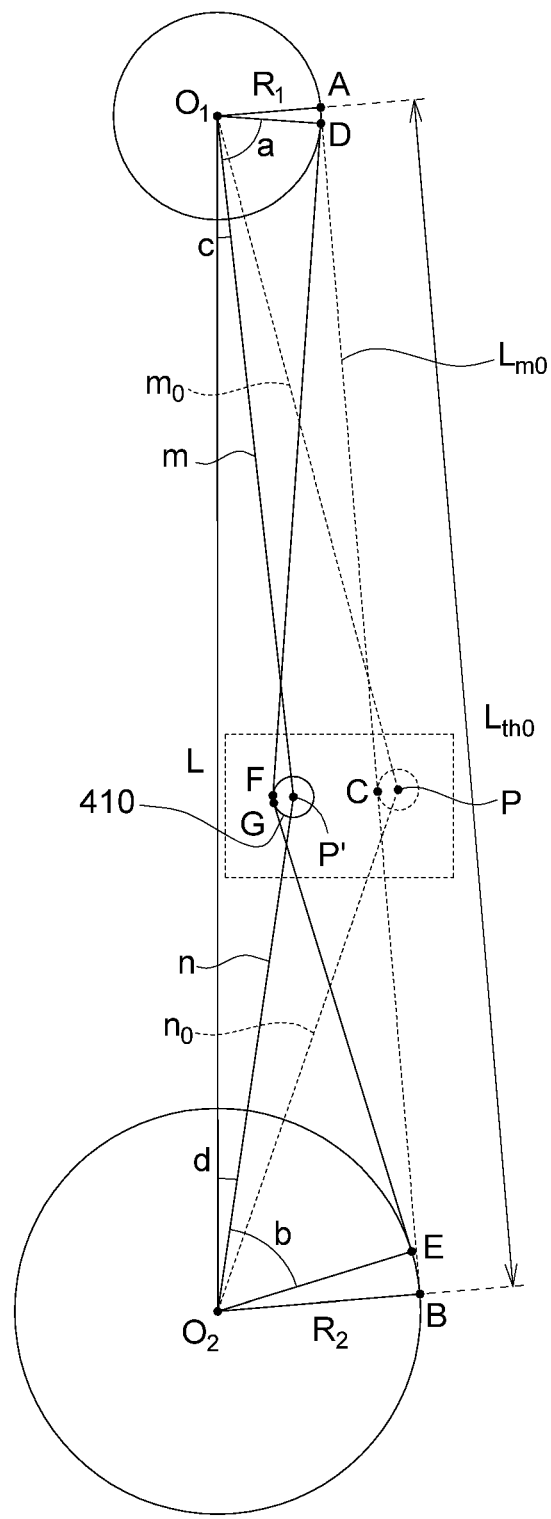
FIG. 6 is a schematic diagram of a grinding and polishing apparatus physical model and a workpiece physical model according to an embodiment of the present disclosure.

In step S131, a grinding and polishing apparatus physical model is created by the simulation unit 130 according to the grinding and polishing apparatus 200. In step S132, a workpiece physical model is created by the simulation unit 130 according to the workpiece 400. It should be noted that step S131 and step S132 can be performed concurrently or consecutively. As indicated in FIG. 5, step S131 is performed before step S132, but this order is for exemplarily rather than restrictive purpose. Refer to FIG. 6, a schematic diagram of a grinding and polishing apparatus physical model 210 and a workpiece physical model 410 according to an embodiment of the present disclosure is shown. The grinding and polishing apparatus physical model 210 and the workpiece physical model 410 include known parameters as follows:

$O_1$, $O_2$: respective center points of two grinding wheels;
$R_1$, $R_2$: respective radii of the two grinding wheels of the grinding and polishing apparatus;
r: a local radius of the workpiece on the touch points (not illustrated);
A, B: touch points between the grinding sand belt and the two grinding wheels at the first time point;
C: a touch point between the workpiece and the grinding sand belt at the first time point;
P: a center point of the workpiece at the first time point;
D, E: touch points between the grinding sand belt and the two grinding wheels at the second time point;
F, G: touch points between the workpiece and the grinding sand belt at the second time point;
P': a center point of the workpiece at the second time point;
$m_0$: a length from $O_1$ to P;
$n_0$: a length from $O_2$ to P
m: a length from $O_1$ to P'
n: length from $O_2$ to P'
a: an angle formed by the line connecting $O_1$ and D and the line connecting $O_1$ and P';
b: an angle formed by the line connecting $O_2$ and E and the line connecting $O_2$ and P';
c: an angle formed by the line connecting $O_1$ and P' and the line connecting $O_1$ and $O_2$;
d: an angle formed by the line connecting $O_2$ and P' and the line connecting $O_1$ and $O_2$;

L: a distance between the two grinding wheels ($O_1$ to $O_2$)

$L_{m0}$: a length from A to C $L_{th0}$: $\sqrt{L^2-(R_1-R_2)^2}$

Then, the method proceeds to step S133, the machining path PT, the process parameters PP and model parameters MP are inputted to the grinding and polishing apparatus physical model 210 and the workpiece physical model 410 by the simulation unit 130 to calculate at least one quality parameter QP. Let the quality parameter QP be the normal/tangential force distribution. The two-dimensional normal/tangential force distribution $F_{2D}$ and the three-dimensional normal/tangential force distribution $F_{3D}$ can be obtained according to formula 1 and formula 2 respectively:

$$F_{2D}=f(T,r,L_{m0},\delta,R_1,R_2,L) \quad \text{(formula 1)}$$

$$F_{3D}=\int^w{}_0 F_{2D}(y) \times dy \quad \text{(formula 2)}$$

Wherein, T represents a sand belt tension (model parameter MP), δ represents a grinding depth (machining path PT).

Let the quality parameter QP be the material removal rate $\gamma_{ij}$. The material removal rate $\gamma_{ij}$ can be obtained according to formula 3:

$$\gamma_{ij} = f(V_b, V_w, C_A, K_A, K_t, F_{3D}) = C_A K_A K_t \frac{(V_b)^\alpha}{(V_w)^\beta}(F_{ij})^\gamma \quad \text{(formula 3)}$$

Wherein $C_A$ represents a fixed calibration parameter (model parameters MP), $K_A$ represents a parameter relevant to the workpiece material and the sand belt number (model parameter MP), $K_t$ represents a wear correction parameter (model parameter MP), $V_b$ represents a sand belt/polisher speed (process parameter PP), $V_w$ represent a workpiece speed (process parameter PP), α, β, γ represent calibration factors (model parameters MP).

Although the above descriptions are exemplified by the normal/tangential force distribution and the material removal rate, the present disclosure is not limited thereto.

Through the grinding and polishing simulation method and system of the present disclosure, model parameters can be identified immediately and at least one quality parameter can be calculated during the grinding and polishing process. Thus, the present disclosure can adjust various device parameters without using a large amount of labor and time.

Figure 7:
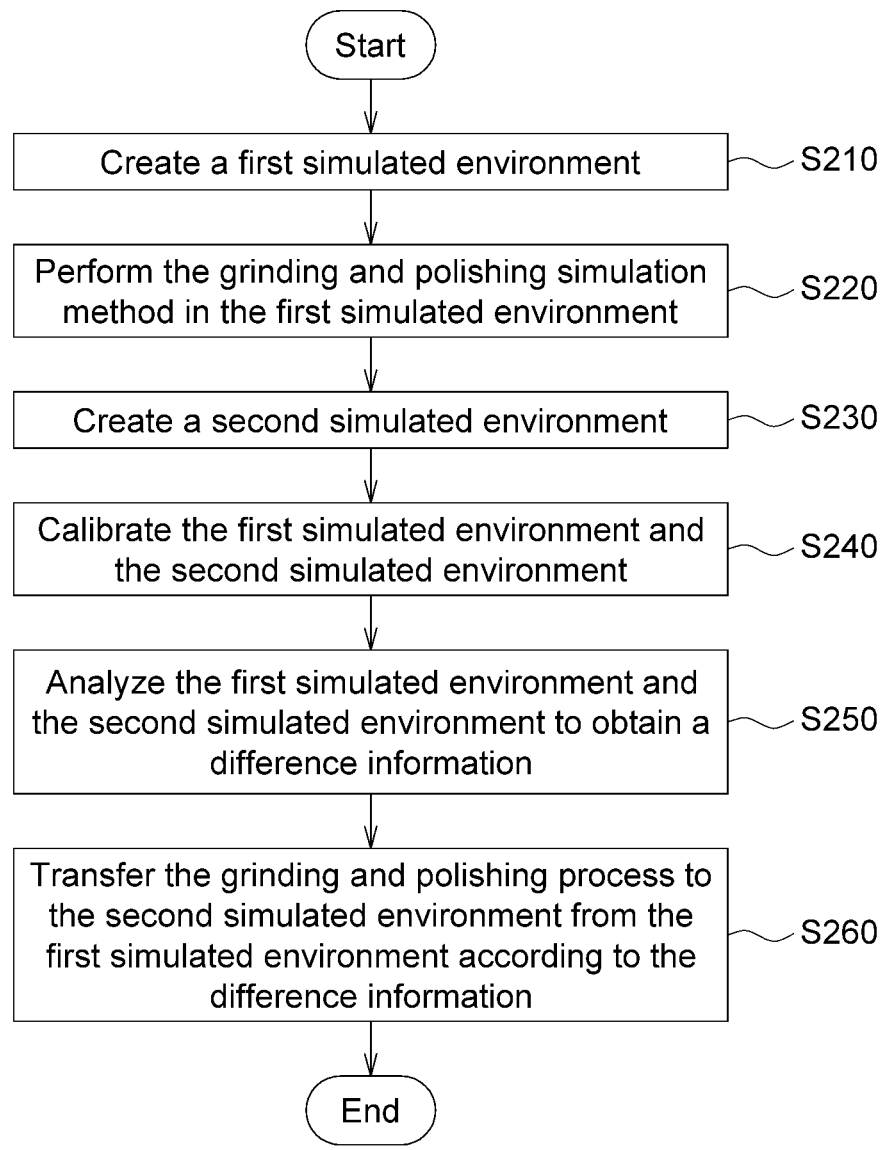
FIG. 7 is a flowchart of a grinding and polishing process transferring method according to an embodiment of the present disclosure.
Figure 8:
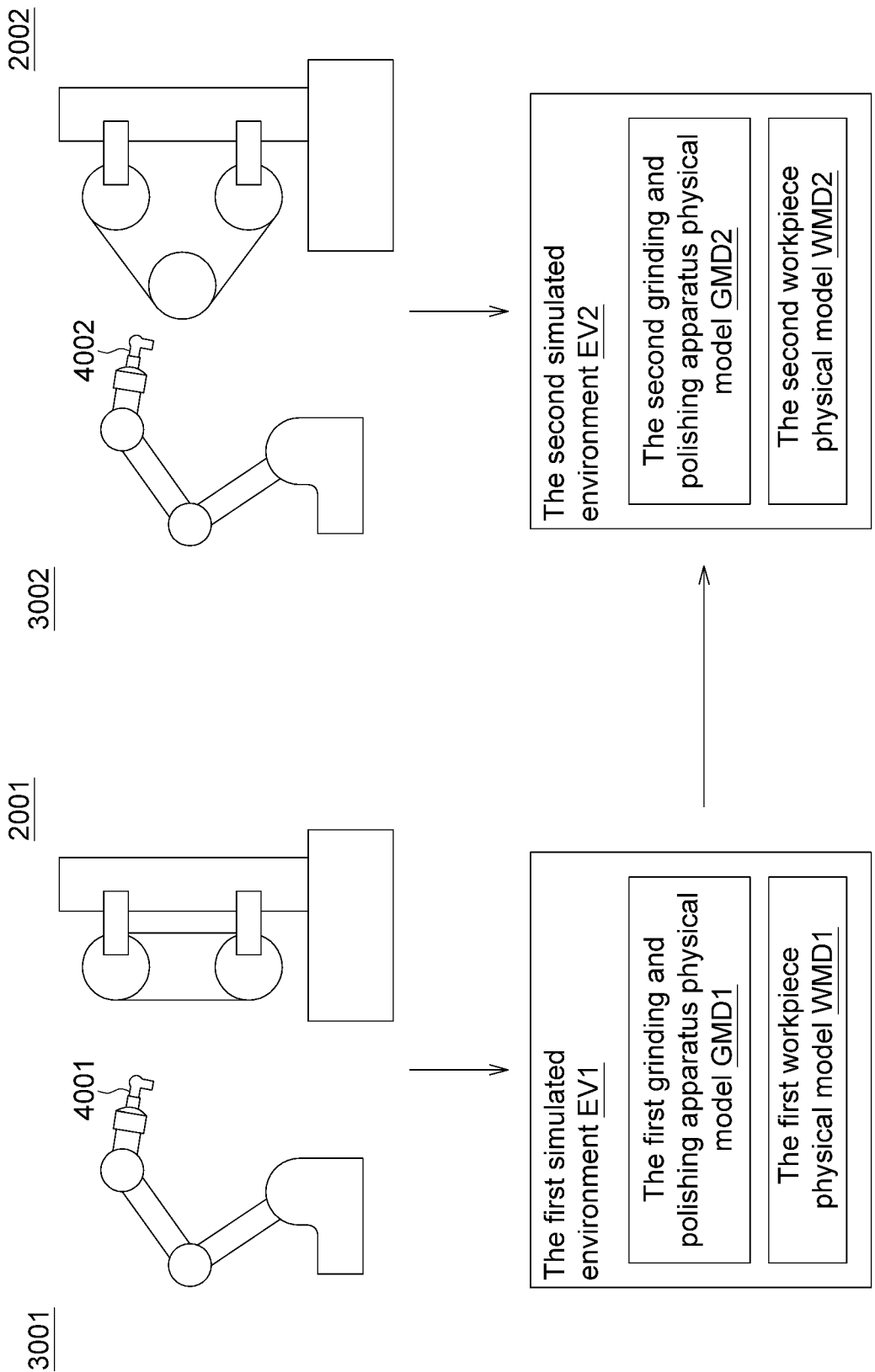
FIG. 8 is a schematic diagram of a grinding and polishing process transfer according to an embodiment of the present disclosure.

Refer to FIGS. 7 and 8. FIG. 7 is a flowchart of a grinding and polishing process transferring method according to an embodiment of the present disclosure. FIG. 8 is a schematic diagram of a grinding and polishing process transfer according to an embodiment of the present disclosure.

In step S210, a first simulated environment EV1 corresponding to a first real environment is created, wherein the first real environment includes a first grinding and polishing apparatus 2001 and a first the robot 3001, and the first simulated environment EV1 includes a first grinding and polishing apparatus physical model GMD1 and a first workpiece physical model WMD1.

In step S220, the grinding and polishing simulation method is performed in the first simulated environment EV1. The grinding and polishing simulation method of the present step is similar to the grinding and polishing simulation method of FIG. 2 to FIG. 4. That is, a first sensing information of the first grinding and polishing apparatus 2001 and the first the robot 3001 when grinding or polishing a first workpiece 4001 is obtained; a plurality of first model parameters is identified according to the first sensing information; a first machining path, a plurality of first process parameters and the first model parameters are outputted to the first grinding and polishing apparatus physical model GMD1 and the first workpiece physical model WMD1 to calculate at least one first quality parameter.

In step S230, a second simulated environment EV2 corresponding to a second real environment is created, wherein the second real environment includes a second grinding and polishing apparatus 2002 and a second robot 3002, and the second simulated environment EV2 includes a second grinding and polishing apparatus physical model GMD2 and a second workpiece physical model WMD2.

In step S240, the first simulated environment EV1 and the second simulated environment EV2 are calibrated. Firstly, a first calibration information associated with the first grinding and polishing apparatus 2001 and the first the robot 3001 is obtained, a second calibration information associated with the second grinding and polishing apparatus 2002 and the second robot 3002 is obtained, and the first simulated environment EV1 and the second simulated environment EV2 are calibrated according to the first calibration information and the second calibration information respectively. The first calibration information is, for example, a position calibration of the first the robot 3001 and the first grinding and polishing apparatus 2001, a size calibration of the gripper unit of the first the robot 3001, a variation correction of the first workpiece 4001, or additional rotation axis calibration of the first grinding and polishing apparatus 2001. The second calibration information is, for example, a position calibration of the second robot 3002 and the second grinding and polishing apparatus 2002, a size calibration of the gripper unit of the second robot 3002, a variation correction of the second workpiece 4002, or additional rotation axis calibration of the second grinding and polishing apparatus 2002.

In step S250, the first simulated environment EV1 and the second simulated environment EV2 are analyzed to obtain a difference information. The difference information is, for example, the geometric difference between the geometry of the first workpiece 4001 and the geometry of the second workpiece 4002 or the configuration difference between the configuration of the first the robot 3001 and the first grinding and polishing apparatus 2001 and the configuration of the second robot 3002 and the second grinding and polishing apparatus 2002.

In step S260, the grinding and polishing process is transferred to the second simulated environment EV2 from the first simulated environment EV1 according to the difference information. Furthermore, at least one part of the first machining path, the first process parameters and the first model parameters are inputted to the second grinding and polishing apparatus physical model GMD2 and the second workpiece physical model WMD2 according to the difference information to simulate the operation of grinding or polishing the second workpiece 4002 by the second grinding and polishing apparatus 2002 and the second robot 3002 and to calculate at least one second quality parameter. In the present step, the first machining path is such as the workpiece machining path or the robot machining path. Furthermore, there is a correspondence relation between the workpiece machining path and the robot machining path, and the workpiece machining path can be transferred to a corresponding robot machining path according to the type of the robot. Detailed descriptions of the difference information are disclosed below.

When the difference information is that the first workpiece 4001 and the second workpiece 4002 are the same, and the configuration of the first the robot 3001 and the first grinding and polishing apparatus 2001 and the configuration of the second robot 3002 and the second grinding and polishing apparatus 2002 are also the same, the first machining path, the first process parameters and the first model parameters are inputted to the second grinding and polishing apparatus physical model GMD2 and the second workpiece physical model WMD2 to simulate the operation of grinding or polishing the second workpiece 4002 by the second grinding and polishing apparatus 2002 and the second robot 3002 and to calculate at least one second quality parameter.

When the difference information is that the first workpiece 4002 and the second workpiece 4002 are the same, but the configuration of the first the robot 3001 and the first grinding and polishing apparatus 2001 and the configuration of the second robot 3002 and the second grinding and polishing apparatus 2002 are different, a plurality of second model parameters is identified in the second simulated environment EV2, and the first machining path, the first process parameters and the second model parameters are inputted to the second grinding and polishing apparatus 2002 physical model GMD2 and the second workpiece physical model WMD2 to simulate the operation of grinding or polishing the second workpiece 4002 by the second grinding and polishing apparatus 2002 and the second robot 3002 and to calculate at least one second quality parameter.

When the difference information is that the first workpiece 4001 and the second workpiece 4002 are different, and the configuration of the first the robot 3001 and the first grinding and polishing apparatus 2001 and the configuration of the second robot 3002 and the second grinding and polishing apparatus 2002 are also different, a plurality of second model parameters is identified in the second simulated environment EV2, the first workpiece 4001 is compared with the second workpiece 4002 to obtain an identical part between the first workpiece 4001 and the second workpiece 4002, and the first machining path corresponding to the identical part, the first process parameter corresponding to the identical part, and the second model parameters are inputted to the second grinding and polishing apparatus physical model GMD2 and the second workpiece physical model WMD2 to simulate the operation of grinding or polishing the second workpiece 4002 by the second grinding and polishing apparatus 2002 and the second robot 3002 and to calculate at least one second quality parameter. Detailed description of the identical part between the first workpiece 4001 and the second workpiece 4002 are disclosed below.

Figure 9:
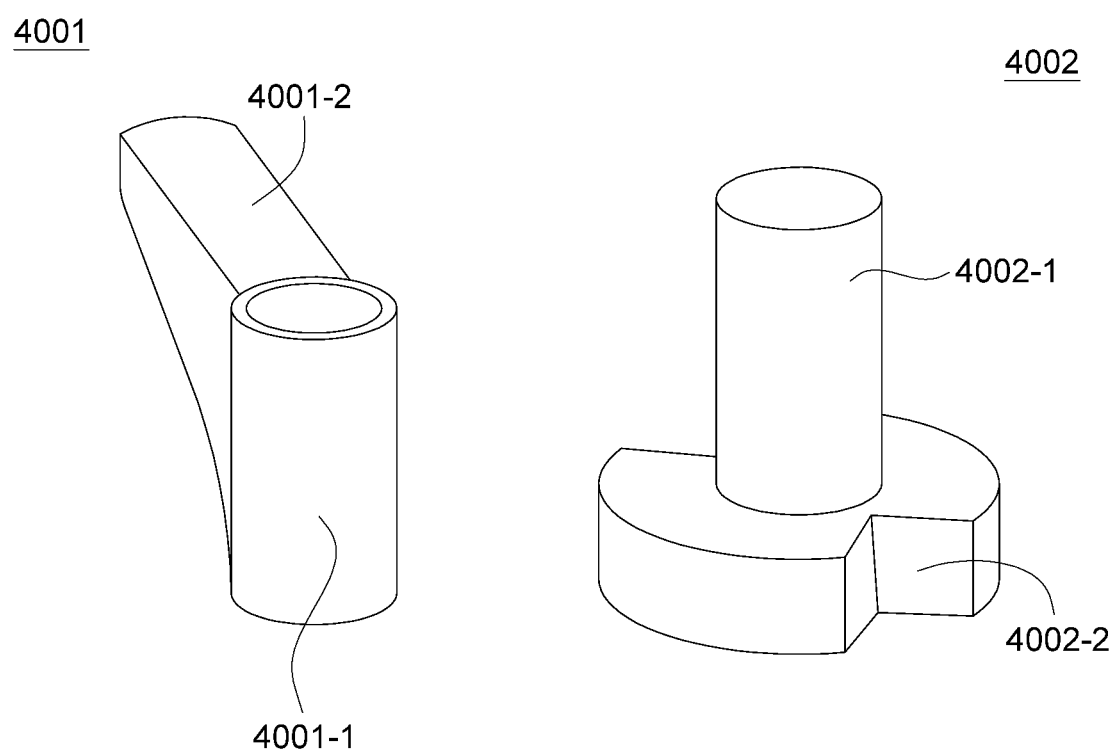
FIG. 9 is a schematic diagram of a first workpiece and a second workpiece according to an embodiment of the present disclosure.

Referring to FIG. 9, a schematic diagram of a first workpiece 4001 and a second workpiece 4002 according to an embodiment of the present disclosure is shown. The first workpiece 4001 includes a first part 4001-1 and a second part 4001-2. The second workpiece 4002 includes a first part 4002-1 and a second part 4002-2. The first part 4001-1 of the the first workpiece 4001 is identical to the second part 4002-1 of the second workpiece 4002, and both the first part 4001-1 and the second part 4002-1 are a cylinder. After the identical part is identified through comparison, the first machining path corresponding to the first part 4001-1 of the first workpiece 4001 and the first process parameter corresponding to the first part 4001-1 of the first workpiece 4001 are inputted to the second grinding and polishing apparatus 2002 physical model GMD2 and the second workpiece physical model WMD2.

Thus, through the grinding and polishing process transferring method of the present disclosure, the grinding and polishing process can be transferred between different production lines according to the commonality and difference information between different production lines.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A grinding and polishing simulation and transferring system, comprising:
   a sensing unit configured to obtain a first sensing information of a first grinding and polishing apparatus when grinding or polishing a first workpiece, wherein the sensing information comprises surface state of the first workpiece;
   an identification unit configured to identify a plurality of first model parameters according to the first sensing information, wherein the first model parameters comprise geometric parameter, sand belt tension and deformation correction parameter of the first grinding and polishing apparatus and the first workpiece; and
   a simulation unit configured to calculate at least one first quality parameter according to a first machining path, a plurality of first process parameters and the plurality of first model parameters, wherein the at least one first quality parameter comprises normal/tangential force distribution, material removal rate, and coverage corresponding to the surface state of the first workpiece,
   wherein the simulation unit is configured to input at least one part of the first machining path, the plurality of first process parameters and the plurality of first model parameters to a second grinding and polishing apparatus physical model and a second workpiece physical model according to a difference information to simulate an operation of grinding or polishing a second workpiece by a second grinding and polishing apparatus and to calculate at least one second quality parameter,
   wherein the simulation unit obtains a first calibration information associated with the first grinding and polishing apparatus and a second calibration information associated with the second grinding and polishing apparatus;
   wherein the first calibration information comprises a position calibration of the first grinding and polishing apparatus, a size calibration of a gripper unit of a first robot, a geometric variation correction of the first workpiece, and an additional rotation axis calibration of the first grinding and polishing apparatus; the second calibration information comprises a position calibration of the second grinding and polishing apparatus, a size calibration of a gripper unit of a second robot, a geometric variation correction of the second workpiece, and an additional rotation axis calibration of the second grinding and polishing apparatus,
   wherein the difference information includes a geometric difference between a geometry of the first workpiece and a geometry of the second workpiece and a configuration difference between a configuration of the first the robot and the first grinding and polishing apparatus and a configuration of the second robot and the second grinding and polishing apparatus,
   wherein a correspondence relation between a workpiece machining path of the first or second workpiece and a robot machining path of the first or second robot is made, and the workpiece machining path can be transferred to a corresponding robot machining path according to a type of the first or second robot.

2. The grinding and polishing simulation system according to claim 1, further comprising:
a machining path generation unit configured to generate the first machining path according to the first workpiece.

3. The grinding and polishing simulation system according to claim 1, wherein the identification unit defines a region, receives the first sensing information of a plurality of touch points in the region, on which the first workpiece is guided by a robot to move relative to the first grinding and polishing apparatus, from the sensing unit, receives the at least one first quality parameter from the simulation unit, and calculates an error between the sensing information and the at least one first quality parameter, and obtains the plurality of first model parameters corresponding to the at least one first quality parameter when the error is lower than a threshold value to identify the plurality of first model parameters.

4. The grinding and polishing simulation system according to claim 1, wherein the simulation unit creates a first grinding and polishing apparatus physical model according to the first grinding and polishing apparatus, creates a first workpiece physical model according to the first workpiece, and inputs the first machining path, the plurality of first process parameters and the plurality of first model parameters to the first grinding and polishing apparatus physical model and the first workpiece physical model to calculate the at least one first quality parameter.

5. The grinding and polishing simulation and transferring system according to claim 4, wherein when the first workpiece and the second workpiece are the same, but the configuration of the first grinding and polishing apparatus and the configuration of the second robot and the second grinding and polishing apparatus are different, the identification unit identifies a plurality of second model parameters; and the first machining path, the plurality of first process parameters, and the plurality of second model parameters are inputted to the second grinding and polishing apparatus physical model and the second workpiece physical model.

6. The grinding and polishing simulation and transferring system according to claim 4, wherein when the first workpiece and the second workpiece are different, and the configuration of the first grinding and polishing apparatus and the configuration of the second grinding and polishing apparatus are also different, the identification unit identifies a plurality of second model parameters and compares the first workpiece with the second workpiece to obtain an identical part between the first workpiece and the second workpiece, and the first machining path corresponding to the identical part, the first process parameter corresponding to the identical part, and the second model parameters are inputted to the second grinding and polishing apparatus physical model and the second workpiece physical model.

7. The grinding and polishing simulation system according to claim 1, wherein the first process parameters comprise grinding and polishing touch points, sand belt number, workpiece speed, sand belt/polisher speed, feed depth, workpiece material, or original surface quality of the workpiece.

8. The grinding and polishing simulation system according to claim 1, wherein the first model parameters further comprise wear correction parameter of the grinding and polishing apparatus and the workpiece.

9. The grinding and polishing simulation system according to claim 1, wherein the at least one first quality parameter further comprises surface roughness.

10. The grinding and polishing simulation system according to claim 1, wherein the first sensing information comprises six-axis force information, geometric variation, or surface roughness.

11. The grinding and polishing simulation system according to claim 1, further comprising:
another sensing unit configured to obtain the plurality of first model parameters from the first grinding and polishing apparatus and the first workpiece.

12. A grinding and polishing process transferring method, comprising:
creating a first simulated environment corresponding to a first real environment, wherein the first real environment comprises a first grinding and polishing apparatus and a first robot, and the first simulated environment comprises a first grinding and polishing apparatus physical model and a first workpiece physical model;
obtaining a first sensing information of the first grinding and polishing apparatus and the first robot when grinding or polishing a first workpiece, wherein the first sensing information comprises surface state of the first workpiece;
identifying a plurality of first model parameters according to the first sensing information, wherein the first model parameters comprise geometric parameter, sand belt tension and deformation correction parameter of the first grinding and polishing apparatus and the first workpiece;
inputting a first machining path, a plurality of first process parameters and the plurality of first model parameters to the first grinding and polishing apparatus physical model and the first workpiece physical model to calculate at least one first quality parameter, wherein the at least one first quality parameter comprises normal/tangential force distribution, material removal rate, and coverage corresponding to the surface state of the workpiece;
creating a second simulated environment corresponding to a second real environment, wherein the second real environment comprises a second grinding and polishing apparatus and a second robot, and the second simulated environment comprises a second grinding and polishing apparatus physical model and a second workpiece physical model;
obtaining a first calibration information associated with the first grinding and polishing apparatus and the first robot, obtaining a second calibration information associated with the second grinding and polishing apparatus and the second robot, and calibrating the first simulated environment and the second simulated environment according to the first calibration information and the second calibration information respectively;
analyzing the first simulated environment and the second simulated environment to obtain a difference information; and
inputting at least one part of the first machining path, the plurality of first process parameters and the plurality of first model parameters to the second grinding and polishing apparatus physical model and the second workpiece physical model according to the difference information to simulate the operation of grinding or polishing a second workpiece by the second grinding and polishing apparatus and the second robot and to calculate at least one second quality parameter;
wherein the first calibration information comprises a position calibration of the first robot and the first grinding and polishing apparatus, a size calibration of a gripper unit of the first robot, a geometric variation correction of the first workpiece, and an additional rotation axis calibration of the first grinding and polishing apparatus; the second calibration information comprises a position calibration of the second robot and the second grinding and polishing apparatus, a size calibration of a gripper unit of the second robot, a geometric variation correction of the second workpiece, and an additional rotation axis calibration of the second grinding and polishing apparatus, wherein the difference information includes a geometric difference between a geometry of the first workpiece and a geometry of the second workpiece and a configuration difference between a configuration of the first the robot and the first grinding and polishing apparatus and a configuration of the second robot and the second grinding and polishing apparatus, wherein a correspondence relation between a workpiece machining path of the first or second workpiece and a robot machining path of the first or second robot is made, and the workpiece machining path can be transferred to a corresponding robot machining path according to a type of the first or second robot.

13. The grinding and polishing process transferring method according to claim 12, wherein inputting at least one part of the first machining path, the plurality of first process parameters and the plurality of first model parameters to the second grinding and polishing apparatus physical model and the second workpiece physical model according to the difference information comprises:

when the first workpiece and the second workpiece are the same, and the configuration of the first robot and the first grinding and polishing apparatus and the configuration of the second robot and the second grinding and polishing apparatus are also the same, inputting the first machining path, the first process parameter and the first model parameter to the second grinding and polishing apparatus physical model and the second workpiece physical model.

14. The grinding and polishing process transferring method according to claim 12, wherein inputting at least one part of the first machining path, the plurality of first process parameters and the plurality of first model parameters to the second grinding and polishing apparatus physical model and the second workpiece physical model according to the difference information comprises:

when the first workpiece and the second workpiece are the same, but the configuration of the first robot and the first grinding and polishing apparatus and the configuration of the second robot and the second grinding and polishing apparatus are different, identifying a plurality of second model parameters, and inputting the first machining path, the plurality of first process parameters and the plurality of second model parameters to the second grinding and polishing apparatus physical model and the second workpiece physical model.

15. The grinding and polishing process transferring method according to claim 12, wherein inputting at least one part of the first machining path, the plurality of first process parameters and the plurality of first model parameters to the second grinding and polishing apparatus physical model and the second workpiece physical model according to the difference information comprises:

when the first workpiece and the second workpiece are different, and the configuration of the first robot and the first grinding and polishing apparatus and the configuration of the second robot and the second grinding and polishing apparatus are also different, identifying a plurality of second model parameters, comparing the first workpiece with the second workpiece to obtain an identical part between the first workpiece and the second workpiece, and inputting the first machining path corresponding to the identical part, the first process parameter corresponding to the identical part, and the second model parameters to the second grinding and polishing apparatus physical model and the second workpiece physical model.

* * * * *